US008819693B2

(12) United States Patent
Abdul et al.

(10) Patent No.: US 8,819,693 B2
(45) Date of Patent: *Aug. 26, 2014

(54) LOGICAL PARTITION DEFRAGMENTATION WITHIN A DATA PROCESSING SYSTEM

(75) Inventors: Anis M. Abdul, Austin, TX (US); Nicholas E. Bofferding, Austin, TX (US); Ajay K. Mahajan, Austin, TX (US); Rashmi Narasimhan, Roundrock, TX (US)

(73) Assignee: International Business Machines Corporation, Armonk, NY (US)

( * ) Notice: Subject to any disclaimer, the term of this patent is extended or adjusted under 35 U.S.C. 154(b) by 17 days.

This patent is subject to a terminal disclaimer.

(21) Appl. No.: 13/459,812

(22) Filed: Apr. 30, 2012

(65) Prior Publication Data

US 2012/0284484 A1 Nov. 8, 2012

Related U.S. Application Data

(63) Continuation of application No. 13/100,358, filed on May 4, 2011.

(51) Int. Cl.
*G06F 9/46* (2006.01)
*G06F 1/00* (2006.01)

(52) U.S. Cl.
USPC .......................................... 718/104; 713/300

(58) Field of Classification Search
None
See application file for complete search history.

(56) References Cited

U.S. PATENT DOCUMENTS

| 6,742,100 | B1 | 5/2004 | Schnee et al. |
| 6,745,312 | B1 | 6/2004 | Schnee et al. |
| 6,968,441 | B1 | 11/2005 | Schnee |
| 7,669,021 | B2 | 2/2010 | Cheng et al. |
| 8,028,184 | B2* | 9/2011 | Sekiguchi et al. ............ 713/323 |
| 8,381,215 | B2* | 2/2013 | Johnson et al. ............... 718/102 |
| 2009/0043877 | A1* | 2/2009 | Grimm et al. ................. 709/223 |
| 2009/0178049 | A1* | 7/2009 | Branda et al. ................. 718/104 |
| 2009/0249104 | A1 | 10/2009 | Ikeda et al. |

OTHER PUBLICATIONS

U.S. Appl. No. 13/100,358.
"HP Integrated Lights-Out (iLO) Advanced", http://h18000.www1.hp.com/products/servers/management/remotemgmt.html, printed Jan. 17, 2011, 2 pages.
"HP Power Regulator", http://h18000.www1.hp.com/products/servers/management/ilo/power-regulator.html, printed Jan. 17, 2011, 2 pages.
Chernicoff, David, "The Impact of Disk Fragmentation on Servers", Diskeeper Corporation, WindowsITPro, Burbank, California, Apr. 7, 2009, 8 pages.

(Continued)

*Primary Examiner* — Kenneth Tang
(74) *Attorney, Agent, or Firm* — Stephen R. Tkacs; Stephen J. Walder, Jr.; Diane R. Gerhardt (57) ABSTRACT

A mechanism, in a data processing system, is provided for logical partition defragmentation. The mechanism gathers resource requirements for a plurality of logical partitions running in a plurality of power domains within one or more servers. The mechanism determines optimal hardware utilization for the plurality of logical partitions. The mechanism migrates one or more of the plurality of logical partitions to run in a subset of the plurality of power domains such that at least one power domain within the plurality of power domains is unused. The mechanism puts the at least one unused power domain in a low power state.

9 Claims, 4 Drawing Sheets

(56) References Cited

OTHER PUBLICATIONS

Graefe, Goetz, "Database servers tailored to improve energy efficiency", Proceedings of the 2008 EDBT Workshop on Software Engineering for Tailor-made Data Management (SETMDM'08), 2008, 5 pages.

Harizopoulos, Stavros et al., "Energy Efficiency: The New Holy Grail of Data Management Systems Research", 4th Biennial Conference on Innovative Data Systems Research (CIDR), Jan. 4-7, 2009, Asilomar, California, 8 pages.

Lang, Willis et al., "Towards Eco-friendly Database Management Systems", 4th Biennial Conference on Innovative Data Systems Research (CIDR), Jan. 4-7, 2009, Asilomar, California, 8 pages.

* cited by examiner

LOGICAL PARTITION DEFRAGMENTATION WITHIN A DATA PROCESSING SYSTEM

This application is a continuation of application Ser. No. 13/100,358, filed May 4, 2011, status pending.

BACKGROUND

The present application relates generally to an improved data processing apparatus and method and more specifically to mechanisms for saving power by logical partition defragmentation within a data processing system.

A logical partition, commonly called an LPAR, is a subset of hardware resources, virtualized as a separate computer. In effect, a physical machine can be partitioned into multiple logical partitions, each hosting a separate operating system. A logically partitioned platform may include partitioned hardware, operating systems, and partition management firmware. The operating systems may be multiple copies of a single operating system or multiple heterogeneous operating systems simultaneously run on the logically partitioned platform. These operating systems may be designed to interface with a virtualization mechanism, such as partition management firmware, e.g., a hypervisor.

Hypervisor software is an example of software that may be used to implement partition management firmware and is available from International Business Machines Corporation. Firmware is "software" stored in a memory chip that holds its content without electrical power, such as, for example, a read-only memory (ROM), a programmable ROM (PROM), an erasable programmable ROM (EPROM), and an electrically erasable programmable ROM (EEPROM). The logical partitions may also include partition firmware.

When logical partitions are instantiated, a copy of the boot strap code is loaded into the logical partitions by the platform firmware. Thereafter, control is transferred to the boot strap code with the boot strap code then loading the open firmware and RTAS. The processors associated or assigned to the logical partitions are then dispatched to the logical partition's memory to execute the logical partition firmware.

The partitioned hardware may include a plurality of processors, a plurality of system memory units, a plurality of input/output (I/O) adapters, and a storage unit. Each of the processors, the memory units, and the I/O adapters may be assigned to one of the multiple logical partitions within the logically partitioned platform, each of which corresponds to one of a plurality of operating systems.

The platform firmware performs a number of functions and services for the logical partitions to create and enforce the partitioning of the logical partitioned platform. The platform firmware is a firmware implemented virtual machine identical to the underlying hardware. Thus, the platform firmware allows the simultaneous execution of independent operating system images by virtualizing all the hardware resources of the logical partitioned platform.

A service processor may provide various services, such as processing of platform errors in the logical partitions. The service processor may also act as a service agent to report errors back to a vendor. Operations of the different logical partitions may be controlled through a hardware management system. The hardware management system is a separate data processing system from which a system administrator may perform various functions including reallocation of resources to different logical partitions.

The partition management firmware may have the capability to migrate logical partitions (Live Partition Mobility) between physical servers. Thus, the firmware may have the capability to consolidate partitions to a single server depending on the workload. Live Partition Mobility is very good when entire servers can be powered down by consolidating logical partitions from different servers to a single server.

SUMMARY

In one illustrative embodiment, a method, in a data processing system, is provided for logical partition defragmentation. The method comprises gathering resource requirements for a plurality of logical partitions running in a plurality of power domains within one or more servers. The method further comprises determining optimal hardware utilization for the plurality of logical partitions. The method further comprises migrating one or more of the plurality of logical partitions to run in a subset of the plurality of power domains such that at least one power domain within the plurality of power domains is unused. The method further comprises putting the at least one unused power domain in a low power state.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for saving power by logical partition defragmentation in server data processing systems. Some servers have power domains, such as nodes in certain systems, which can be controlled to reduce power consumption when not all the system resources are in use. A node may comprise a CPU/memory whose power can be controlled individually. In a single server, during fluctuating workload conditions, the hardware management system may start and stop logical partitions as the need arises.

With logical partition migration, the resulting logical partitions may use the hardware resources such that power usage is not optimal. For example, consider a hypothetical example where a server has two nodes that can host two partitions. In this example, for simplicity, each partition requires the same amount of hardware resources. The server can handle four partitions in total. If the system is operating at full load, then all four partitions will be active on the two nodes. However, once the load reduces resulting in two of the four partitions powering off, the hardware management system may stop logical partitions such that each node hosts one logical partition. This results in power being wasted, because only one node is required to host two logical partitions.

The mechanism of the illustrative embodiments uses an external monitor application that monitors the resource requirements for logical partitions and performs partition "defragmentation." The mechanism defragments the logical partitions such that the mechanism consolidates logical partitions into power domains, allowing other power domains to be freed up and then powered off (or hibernated). If the mechanism receives a request to start a new partition, the external monitor application will power on a node, if necessary, to allow the new logical partition to start.

Figure 1:
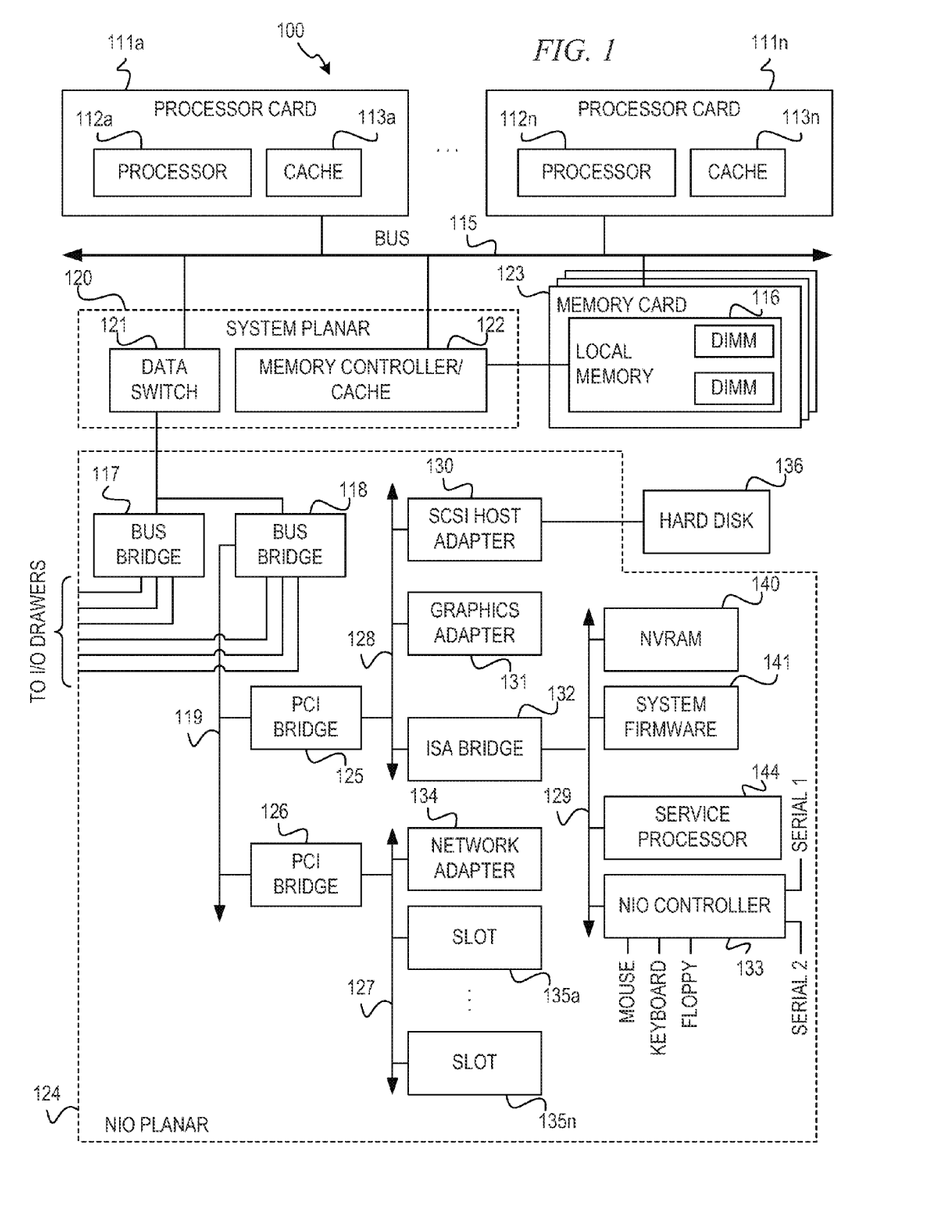
FIG. 1 depicts a block diagram of a data processing system with which aspects of the illustrative embodiments may advantageously be utilized.
Figure 2:
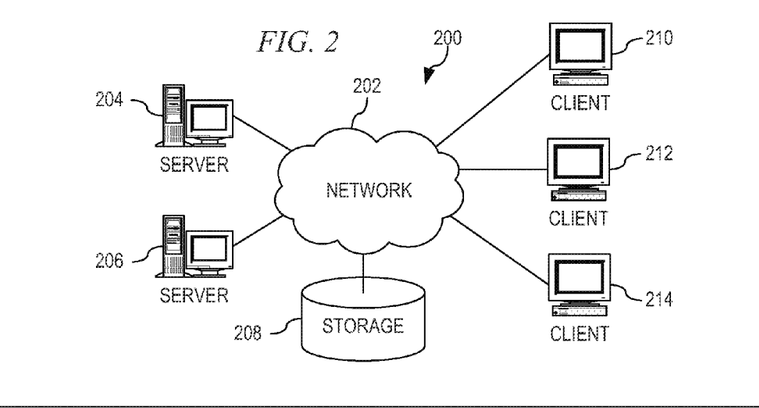
FIG. 2 depicts a pictorial representation of an example distributed data processing system in which aspects of the illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a block diagram of a data processing system with which aspects of the illustrative embodiments may advantageously be utilized. As shown, data processing system 100 includes processor cards 111*a*-111*n*. Each of processor cards 111*a*-111*n* includes a processor and a cache memory. For example, processor card 111*a* contains processor 112*a* and cache memory 113*a*, and processor card 111*n* contains processor 112*n* and cache memory 113*n*.

Processor cards 111*a*-111*n* are connected to main bus 115. Main bus 115 supports a system planar 120 that contains processor cards 111*a*-111*n* and memory cards 123. The system planar also contains data switch 121 and memory controller/cache 122. Memory controller/cache 122 supports memory cards 123 that include local memory 116 having multiple dual in-line memory modules (DIMMs).

Data switch 121 connects to bus bridge 117 and bus bridge 118 located within a native I/O (NIO) planar 124. As shown, bus bridge 118 connects to peripheral components interconnect (PCI) bridges 125 and 126 via system bus 119. PCI bridge 125 connects to a variety of I/O devices via PCI bus 128. As shown, hard disk 136 may be connected to PCI bus 128 via small computer system interface (SCSI) host adapter 130. A graphics adapter 131 may be directly or indirectly connected to PCI bus 128. PCI bridge 126 provides connections for external data streams through network adapter 134 and adapter card slots 135*a*-135*n* via PCI bus 127.

An industry standard architecture (ISA) bus 129 connects to PCI bus 128 via ISA bridge 132. ISA bridge 132 provides interconnection capabilities through NIO controller 133 having serial connections Serial 1 and Serial 2. A floppy drive connection, keyboard connection, and mouse connection are provided by NIO controller 133 to allow data processing system 100 to accept data input from a user via a corresponding input device. In addition, non-volatile RAM (NVRAM) 140 provides a non-volatile memory for preserving certain types of data from system disruptions or system failures, such as power supply problems. A system firmware 141 is also connected to ISA bus 129 for implementing the initial Basic Input/Output System (BIOS) functions. A service processor 144 connects to ISA bus 129 to provide functionality for system diagnostics or system servicing.

The operating system (OS) is stored on hard disk 136, which may also provide storage for additional application software for execution by data processing system. NVRAM 140 is used to store system variables and error information for field replaceable unit (FRU) isolation. During system startup, the bootstrap program loads the operating system and initiates execution of the operating system. To load the operating system, the bootstrap program first locates an operating system kernel type from hard disk 136, loads the OS into memory, and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management.

The illustrative embodiment may be embodied in a variety of data processing systems utilizing a number of different hardware configurations and software such as bootstrap programs and operating systems. The data processing system 100 may be, for example, a stand-alone system or part of a network such as a local-area network (LAN) or a wide-area network (WAN).

FIG. 2 depicts a pictorial representation of an example distributed data processing system in which aspects of the illustrative embodiments may be implemented. Distributed data processing system 200 may include a network of computers in which aspects of the illustrative embodiments may be implemented. The distributed data processing system 200 contains at least one network 202, which is the medium used to provide communication links between various devices and computers connected together within distributed data processing system 200. The network 202 may include connections, such as wire, wireless communication links, or fiber optic cables.

In the depicted example, server 204 and server 206 connect to network 202 along with storage unit 208. In addition, clients 210, 212, and 214 also connect to network 202. These clients 210, 212, and 214 may be, for example, personal computers, network computers, or the like. In the depicted example, server 204 provides data, such as boot files, operating system images, and applications to the clients 210, 212, and 214. Clients 210, 212, and 214 are clients to server 204 in the depicted example. Distributed data processing system 200 may include additional servers, clients, and other devices not shown.

In the depicted example, distributed data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 200 may also be implemented to include a number of different types of networks, such as for example, an intranet, a local area network (LAN), a wide area network (WAN), or the like.

Data processing system 100 in FIG. 1 may be a server, such as server 204 or server 206 in FIG. 2. Servers 204, 206 may be capable of migrating logical partitions (Live Partition Mobility) such that during periods of low workload one of server 204 and server 206 may be shut down. As stated above, Live Partition Mobility is very good when entire servers can be powered down by consolidating logical partitions from servers 204 and 206 to just server 204, for example. However, within a single server, the partition management firmware may not use the hardware resources within multiple power domains optimally. In accordance with an illustrative embodiment, a mechanism saves power in servers 204, 206 by actively monitoring resource requirements of every partition and moving the partitions to run on hardware within one or more power domains and shutting down hardware within unused power domains.

Figure 3:
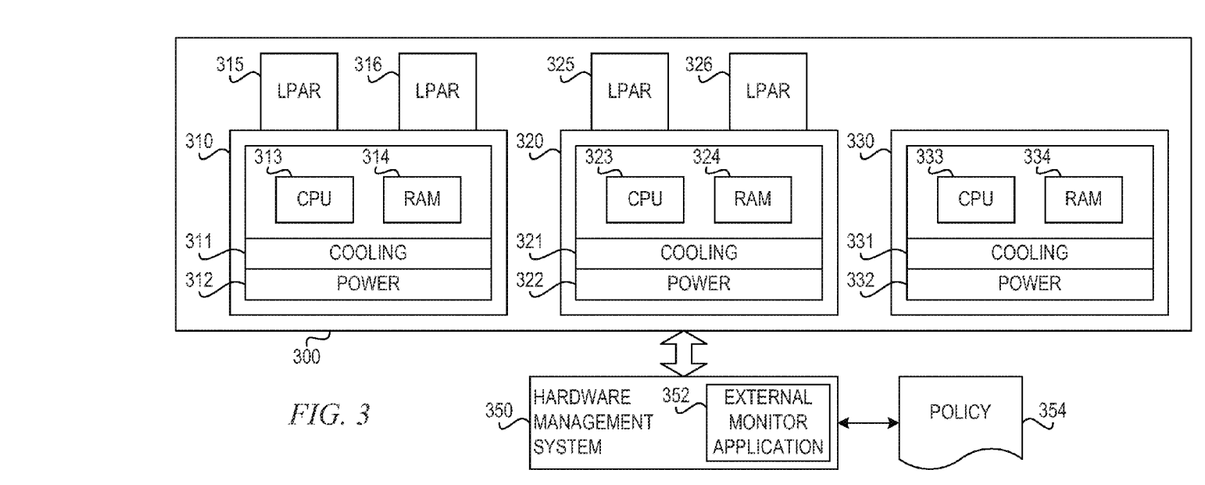
FIG. 3 is a block diagram illustrating a data processing system with logical partition defragmentation in accordance with an illustrative embodiment.

FIG. 3 is a block diagram illustrating a data processing system with logical partition defragmentation in accordance with an illustrative embodiment. Data processing system 300 comprises hardware in a plurality of power domains 310, 320, 330. Power domain 310 comprises central processing unit (CPU) 313, random access memory (RAM) 314, and cooling 311, which use power 312. Power domain 320 comprises central processing unit (CPU) 323, random access memory (RAM) 324, and cooling 321, which use power 322. Power domain 330 comprises central processing unit (CPU) 333, random access memory (RAM) 334, and cooling 331, which use power 332.

Power domains 310, 320, 330 may be controlled independently, such that one or more power domains may be shut down to save power. For instance, in FIG. 3 power domain 310 hosts logical partition (LPAR) 315 and LPAR 316, power domain 320 hosts LPAR 325 and LPAR 326, and power domain 330 does not host any partitions. Thus, in this example, power domain 330 may be shut down or hibernated to save power.

In accordance with the illustrative embodiment, hardware management system 350 runs an external monitor application 352 that monitors resource requirements for logical partitions 315, 316, 325, 326 in data processing system 300. Hardware management system 350 may move logical partitions to hardware that shares the same power domain. Hardware management system 350 may use logical partition migration to allow grouping of LPARs to consolidate LPARs to a smaller number of power domains. LPAR migration is a known technique for moving a LPAR from one set of hardware resources, such as a processor or a server, to another set of hardware resources. LPAR migration may comprise capturing the state of the LPAR (i.e., execution state of operating system and application software, hardware states, register values, etc.), starting an instance of the LPAR on the new hardware, restoring the LPAR to the captured state, and removing the previous instance of the LPAR from the old hardware.

For any power domain whose hardware is not used, hardware management system 350 powers the power domain off or transitions the power domain to a low power state. Hardware management system 350 selectively powers up hardware as the number of logical partitions and/or logical partition hardware usage increases. For instance, hardware management system 350 may power on power domain 330 to support a new LPAR, if needed.

Thus, in accordance with the illustrative embodiment, the hardware management system 350 detects current hardware utilization and calculates the optimal hardware utilization for the current LPAR requirements. Using the optimal hardware utilization requirement, the hardware management system 350 migrates LPARs so that the freed hardware power domains can be powered off. The hardware management system may perform monitoring via the external monitor application 352 at a set interval (e.g., 3 hours).

In the depicted example, the external monitor application 352 runs on the hardware management system (console) 350. Thus, the external monitor application 352 may have the ability to monitor multiple servers. The external monitor application 352 depends on existing firmware within the data processing system 300 to perform migration of LPARs within the same server boundary. Hardware management system 350 may combine the logical partition defragmentation with Live Partition Mobility to optimize allocation of LPARs among one or more server data processing systems and one or more power domains within each server data processing system.

Hardware management system 350 may receive user defined policy 354 and optimize allocation of LPARs among the servers and power domains within each server according to the policy 354. Thus, policy 354 may define that hardware management system 350 should favor allocations that minimize power consumption or, alternatively, favor allocations that minimize the number of LPAR migrations, as migrations may disrupt service.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
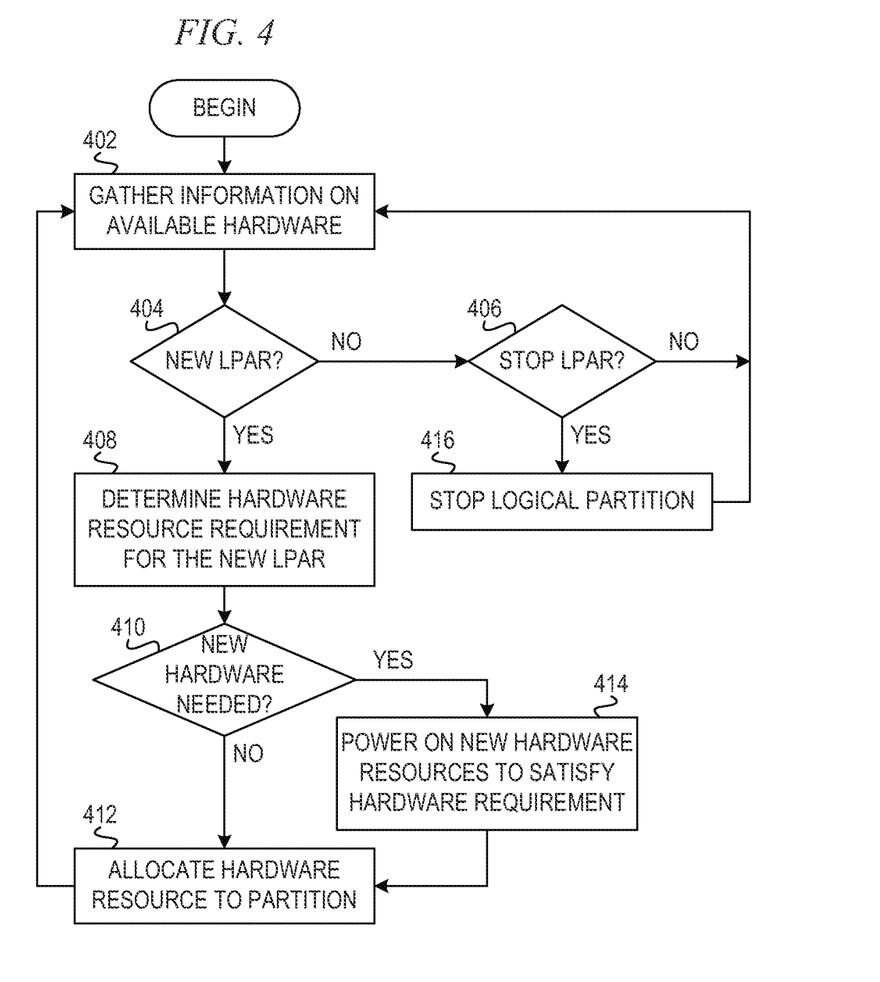
FIG. 4 is a flowchart illustrating operation of a mechanism for partition management with logical partition defragmentation within a server data processing system in accordance with an illustrative embodiment.

FIG. 4 is a flowchart illustrating operation of a mechanism for partition management with logical partition defragmentation within a server data processing system in accordance with an illustrative embodiment. The mechanism may be part of partition management firmware within a server data processing system or may be part of an external hardware management system, such as hardware management system 350 in FIG. 3. Operation begins, and the mechanism gathers information on available hardware (bock 402). The mechanism determines whether to provision a new logical partition (LPAR) based on fluctuating workload (block 404). If the mechanism determines not to provision a new LPAR, then the mechanism determines whether to stop an LPAR based on fluctuating workload (block 406). If the mechanism determines not to stop an LPAR, then operation returns to block 402 to gather information on available hardware.

During periods of low workload, the mechanism will provision fewer LPARs, because few LPARs are needed to handle the workload. For example, a Web server may receive a large number of requests during normal business hours, a moderate number of requests during the early morning and evening, and a relatively small number of requests during nighttime hours. Thus, the mechanism would provision few LPARs to handle the requests during nighttime hours, provision more LPARs to handle requests during early morning hours, and provision even more LPARs to handle requests during normal business hours. The mechanism may then stop LPARs as requests diminish during the evening hours and then diminish even further into the nighttime hours. The mechanism may monitor workload and provision or de-provision LPARs accordingly.

If the mechanism determines to provision a new LPAR in block 404, then the mechanism determines hardware resource requirements for the new LPAR (block 408). The hardware resource requirements are part of the profile configuration information of an LPAR (new or running). In one embodiment, a user stores a configuration for an instance of an LPAR requesting a certain amount of processing power, memory, etc. This information may be defined as part of a service level agreement (SLA), where an instance of an LPAR is guaranteed a predetermined amount of processing power, memory, and the like. The SLA may also define that each request will receive a response in a predefined amount of time, thus requiring more LPARs during increased workload.

The mechanism then determines whether new hardware is needed for the new LPAR (block 410). If the mechanism determines that new hardware is not needed, then the mechanism allocates currently powered hardware resources to the partition (block 412), and operation returns to block 402 to gather information on available hardware. The mechanism may always try to provision new workload without having to power additional resources (a new power domain), if possible. That is, if a sufficient amount of unallocated resources exist in an active power domain, the mechanism may provision the LPAR to that power domain. If this cannot be satisfied, the mechanism may then power on one or more new power domains. If the mechanism determines that new hardware is needed in block 410, then the mechanism powers on new hardware resources to satisfy the hardware requirements of the new LPAR (block 414) and allocates the new hardware resources to the partition (block 412). Then, operation proceeds to block 402 to gather information on available hardware.

Allocating new hardware resources to a partition is a standard operation in logical partitioning data processing systems where the hardware management system requests firmware to allocate a partition to specific physical hardware resources. This firmware may be referred to as a "hypervisor" in various server systems by International Business Machines Corporation. This firmware may also be referred to as a virtual machine manager (VMM) or, more generally, a "virtualization layer" in other systems.

Returning to block 406, if the mechanism determines to stop an LPAR, the mechanism stops the logical partition (block 416), and operation returns to block 402 to gather information on available hardware.

Figure 5:
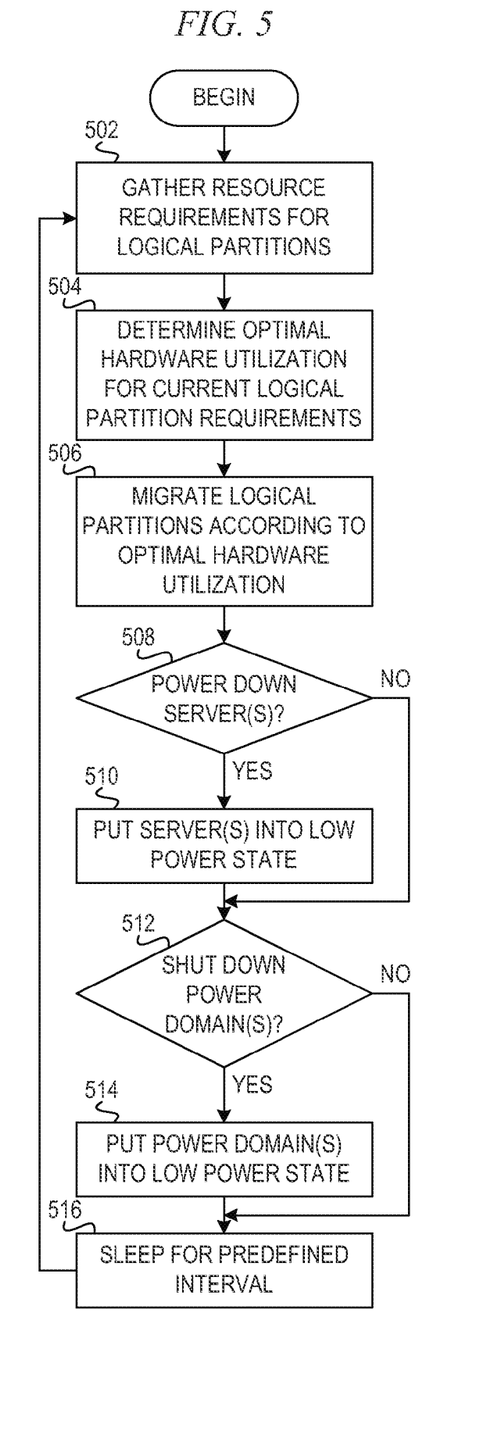
FIG. 5 is a flowchart illustrating operation of a mechanism within an external hardware management system for logical partition defragmentation in accordance with an illustrative embodiment.

FIG. 5 is a flowchart illustrating operation of a mechanism within an external hardware management system for logical partition defragmentation in accordance with an illustrative embodiment. Operation begins, and the mechanism gathers resource requirements for logical partitions within one or more server data processing systems (block 502). As described above, the hardware resource requirements are part of the profile configuration information of an LPAR (new or running). The mechanism determines optimal hardware utilization for current logical partition (LPAR) requirements (block 504). The operation of determining optimal hardware utilization for current LPAR requirements is described below with reference to an example embodiment shown in FIG. 6.

The mechanism then migrates LPARs according to the optimal hardware utilization (block 506). As stated above, LPAR migration is a known technique for moving a LPAR from one set of hardware resources, such as a processor or a server, to another set of hardware resources.

LPARs may have uniform or different hardware requirements. For example, in a Web server data processing system, the mechanism may provision a plurality of instances of the same LPAR running Web server software. Alternatively, the mechanism may provision LPARs running different software to provide different services (e.g., billing, metering, translation, etc.) depending upon requests received or based on a schedule. These LPAR instances may have different hardware requirements.

For example, over the course of several hours, a server data processing system having four power domains may provision a first LPAR with Web server software, a second LPAR with billing server software, a third LPAR with language translation software, and a fourth LPAR with chat server software to the first power domain. As workload increases, the server data processing system may provision a fifth LPAR with Web server software and a sixth LPAR with chat server software to the second power domain, thus powering on the second power domain. The server data processing system may then stop the second LPAR according to a schedule. Later, the server data processing system may stop the sixth LPAR due to decreased workload. The mechanism of the illustrative embodiments may then determine that the fifth LPAR may be migrated to the first power domain such that the second power domain may be transitioned to a low power state.

In one example embodiment, the mechanism may determine optimal hardware utilization by taking into account the hardware needs of each LPAR and simply finding an allocation that meets the hardware needs of the LPARs with a fewest number of power domains active. This allows the mechanism to transition the remaining power domains to a low power state, thus saving power.

In an alternative embodiment, the optimal hardware utilization may be one requiring the fewest LPAR migrations, because LPAR migration may result in disruption of service. If the LPAR has an associated service level agreement (SLA) that guarantees a percentage of availability (e.g., five nines (99.999%) availability), then migrating that particular LPAR may jeopardize satisfying the SLA. In this instance, the mechanism must select a hardware utilization that does not requiring that LPAR. The mechanism may also take into account the performance characteristics and power utilization of each power domain in the case of a heterogeneous data processing system. Thus, the optimal hardware utilization may be one resulting in the lowest power consumption while satisfying service level agreements.

In one example embodiment, a user may define a policy for determining optimal hardware utilization. The policy may indicate whether to favor lowest power, whether to favor fewest LPAR migrations, whether to allow migration of LPARs with guaranteed availability, etc.

The mechanism may migrate LPARs within a server data processing system to consolidate LPARs to a subset of power domains, allowing the server data processing system to power down one or more power domains or put one or more domains into a low power state. In one example embodiment, the mechanism may migrate LPARs between server data processing systems, which may allow one or more servers to power down one or more power domains or may allow one or more server data processing systems to power down or hibernate.

Thus, the mechanism determines whether to power down one or more servers (block 508). If the mechanism determines to power down one or more servers, the mechanism puts the one or more servers into a low power state (block 510).

Thereafter, or if the mechanism determines not to power down one or more servers, the mechanism determines whether to shut down one or more power domains (block 512). If the mechanism determines to power down one or more power domains, the mechanism puts the one or more power domains into a low power state (block 514). Thereafter, or if the mechanism determines not to power down one or more power domains, the mechanism sleeps for a predefined interval (block 516), and operation returns to block 502 to gather resource requirements for logical partitions.

Figure 6:
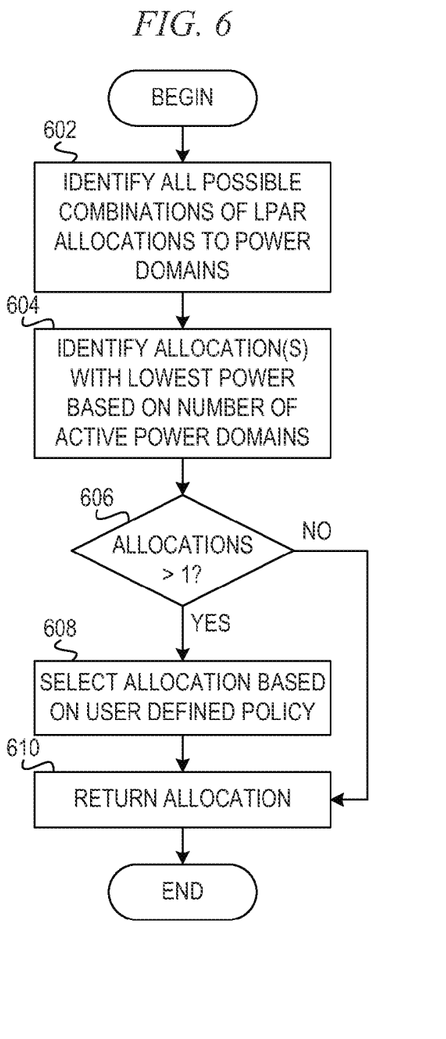
FIG. 6 is a flowchart illustrating operation of a mechanism for determining optimal hardware utilization in accordance with an example embodiment.

FIG. 6 is a flowchart illustrating operation of a mechanism for determining optimal hardware utilization in accordance with an example embodiment. Operation begins, and the mechanism identifies all possible combinations of current LPAR allocations to power domains (block 602). The mechanism may identify all possible combinations by forming a search tree with each branch from a given node representing a given LPAR being allocated to a different power domain.

Each leaf node represents an allocation of all currently running LPARs to a power domain. The mechanism may prune leaves or branches from the search tree that do not satisfy the hardware requirements of the LPARs.

The mechanism then identifies allocations with lowest power based on the number of active power domains (block 604). The mechanism may examine the search tree identifying the leaf nodes with the fewest active power domains. The mechanism may identify a single allocation having a fewest number of active power domains; however, it is likely that a plurality of possible allocations may have the same number of active power domains and, thus, the same amount of power usage.

The mechanism then determines whether the number of allocations is greater than one (1) (block 606). If the number of allocations is greater than one, then the mechanism selects an allocation based on a user defined policy (block 608). The mechanism then returns the allocation as the optimal hardware utilization for current logical partition requirements (block 610), and operation ends. The user defined policy may define rules for selecting an allocation. For example, the policy may define that the mechanism is to favor an allocation with the fewest number of LPAR migrations. If the number of allocations is one in block 606, then the mechanism returns the allocation as the optimal hardware utilization for current logical partition requirements (block 610), and operation ends.

The illustrative embodiments provide mechanisms for saving power in servers by monitoring resources within partitions. The mechanisms determine underutilized resources and consolidate running workloads onto a common set of power domains so that other power domains may be powered down until needed at a further time. An external application monitors resource requirements for every partition running in a server. The mechanisms move logical partitions to hardware resources that share the same power domain or a subset of the power domains. The mechanism may allow grouping to occur by moving a smaller number of partitions. Any power domain whose resources are not used powers down or is put into a low power state. The mechanisms may selectively power up hardware as the logical partition hardware need increases. New logical partitions that require additional hardware resources will power on the previously powered off hardware to satisfy the hardware requirement.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, logical partition defragmentation, the method comprising:
   determining resource requirements for a plurality of logical partition running in a plurality of power domains within one or more servers;
   identifying possible combinations of the plurality of logical partitions allocated to the plurality of power domains that satisfy the resource requirements for the plurality of logical partitions;
   identifying an optimal combination of the plurality of logical partitions allocated to the plurality of power domains having a lowest number of active power domains;
   migrating one or more of the plurality of logical partitions to run in a subset of the plurality of power domains according to the optimal combination such that at least one power domain within the plurality of power domains is unused; and
   transitioning the at least one unused power domain to a low power state,
   wherein identifying the combination of the plurality of logical partitions allocated to the plurality of power domains having a lowest number of active power domains comprises:
      identifying a plurality of combinations of the plurality of logical partitions allocated to the plurality of power domains having a lowest number of active power domains; and
      selecting the combination of the plurality of logical partitions allocated to the plurality of power domains based on a user defined policy.

2. The method of claim 1, further comprising:
   responsive to a request to start a new logical partition, determining requirements for the new logical partition;
   determining whether new hardware is needed for the new logical partition to the resource requirements for the new logical partition; and
   responsive to a determination that new hardware is needed for the new logical partition, powering on a new power domain and allocating the new power domain to the new logical partition.

3. The method of claim 1, wherein migrating the one or more of the plurality of logical partitions results in a server being unused, the method further comprising:
   transitioning the server to a low power state.

4. The method of claim 1, wherein transitioning the at least one unused power domain to a low power state comprises hibernating the at least one unused power domain.

5. The method of claim 1, wherein determining resource requirements for the plurality of logical partitions comprises:
   receiving configuration information for each logical partition and determining the resource requirements for each of the plurality of logical partitions based on the configuration information.

6. The method of claim 1, wherein identifying possible combinations of the plurality logical partitions allocated, to the plurality of power domains comprises forming a search tree, wherein each leaf node of the search tree represents an allocation of the plurality of logical partitions to the plurality of power domains.

7. The method of claim 1, further comprising repeating gathering resource requirements, identifying possible combinations of the plurality logical partitions allocated to the plurality of power domains that satisfy the resource requirements, identifying an optimal combination of the plurality of logical partitions allocated to the plurality of power domains having a lowest number of active power domains, and migrating one or more of the plurality of logical partitions periodically.

8. The method of claim 1, wherein each power domain within the plurality of power domains comprises at least one central processing unit, random access memory, and cooling that use power and can be independently controlled to save power.

9. A method, in a data processing system, for logical partition defragmentation, the method comprising:

determining resource requirements for a plurality of logical partitions running in a plurality of power domains within one or more servers;

identifying possible combinations of the plurality of logical partitions allocated to the plurality of power domains that satisfy the resource requirements for the plurality of logical partitions;

identifying an optimal combination of the plurality of logical partitions allocated to the plurality of power domains having a lowest number of active power domains;

migrating one or more of the plurality of logical partitions to run in a subset of the plurality of power domains according to the optimal combination such that at least one power domain within the plurality of power domains is unused; and     transitioning the at least one unused power domain to a low power state,     wherein identifying the combination of the plurality of logical partitions allocated to the plurality of power domains having a lowest number of active power domains comprises:

identifying a plurality of combinations of the plurality of logical partitions allocated to the plurality of power domains having a lowest number of active power domains; and         selecting the combination of the plurality of logical partitions allocated to the plurality of power domains having a fewest number of logical partition migrations.

\* \* \* \* \*